(12) United States Patent
Duraj et al.

(10) Patent No.: US 9,024,265 B2
(45) Date of Patent: May 5, 2015

(54) PHOTOSENSOR TESTING APPARATUS, A RADIATION DETECTION APPARATUS INCLUDING A PHOTOSENSOR AND A METHOD OF SELECTING THE PHOTOSENSOR FOR THE RADIATION DETECTION APPARATUS

(71) Applicants: Artan Duraj, Seven Hills, OH (US); John M. Frank, Hartville, OH (US)

(72) Inventors: Artan Duraj, Seven Hills, OH (US); John M. Frank, Hartville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 14/037,455

(22) Filed: Sep. 26, 2013

(65) Prior Publication Data

US 2014/0091226 A1    Apr. 3, 2014

Related U.S. Application Data

(60) Provisional application No. 61/707,995, filed on Sep. 30, 2012, provisional application No. 61/718,507, filed on Oct. 25, 2012.

(51) Int. Cl.
*G01T 1/20* (2006.01)
*G01J 1/16* (2006.01)
(Continued)

(52) U.S. Cl.
CPC ............. *G01J 1/1626* (2013.01); *G01T 1/2006* (2013.01); *G01T 1/202* (2013.01); *G01J 2001/4247* (2013.01); *G01J 1/08* (2013.01); *G01J 3/10* (2013.01); *G01J 3/505* (2013.01)

(58) Field of Classification Search
CPC ............ G01T 1/20; G01T 3/06; G01T 1/2006

USPC .................................. 250/366, 361 R, 252.1
See application file for complete search history.

(56) References Cited

U.S. PATENT DOCUMENTS 4,582,988 A * 4/1986 Aagano ......................... 250/585
5,376,797 A * 12/1994 Persyk et al. ............. 250/363.09
(Continued)

FOREIGN PATENT DOCUMENTS

JP          11-211612 A    8/1999
KR    10-2007-0010571 A    1/2007
KR    10-2009-0065940 A    6/2009

OTHER PUBLICATIONS

Oberto, R. J. et al., "Calibration of the Thomson Scattering System on the ZaP Experiment",University of Washington, Aerospace & Energetics Research Program, Plasma Dynamics Group, Nov. 2009, 24 pgs.

(Continued)

*Primary Examiner* — Kiho Kim
(74) *Attorney, Agent, or Firm* — Abel Law Group, LLP; Robert N. Young

(57) ABSTRACT

A photosensor testing apparatus can be used to test photosensors. A light module can produce simulating light that corresponds to scintillating light of a scintillator or a derivative of the scintillating light. A photosensor under test can produce an output that can be analyzed. A particular photosensor can be determined to have a higher quantum efficiency, a higher signal-to-noise ratio, or another performance criterion and selected for use in a radiation detection apparatus having the scintillator that can produce the scintillating light. The photosensor testing apparatus can provide a more accurate way of selecting a photosensor as compared to only analyzing an emission spectrum and data sheets and other information for the photosensors under consideration.

19 Claims, 5 Drawing Sheets

(51) Int. Cl.
    *G01T 1/202*    (2006.01)
    *G01J 1/08*     (2006.01)
    *G01J 3/10*     (2006.01)
    *G01J 3/50*     (2006.01)
    *G01J 1/42*     (2006.01)

(56) References Cited

U.S. PATENT DOCUMENTS

| | | | |
|---|---|---|---|
| 6,133,952 A | | 10/2000 | Tewinkle et al. |
| 6,700,661 B1 | | 3/2004 | Cadell et al. |
| 7,372,017 B2 | * | 5/2008 | Hornig .................. 250/252.1 |
| 7,405,384 B2 | | 7/2008 | Klosowiak et al. |
| 8,044,367 B2 | * | 10/2011 | Yoshikawa et al. ...... 250/390.11 |
| 2001/0013572 A1 | | 8/2001 | Kuderer |
| 2010/0256943 A1 | | 10/2010 | Donnenberg et al. |
| 2010/0314550 A1 | * | 12/2010 | Yoshikawa et al. ...... 250/390.11 |
| 2011/0051996 A1 | * | 3/2011 | Gudmundson et al. ....... 382/100 |

OTHER PUBLICATIONS

International Search Report for PCT/US2013/061794 dated Jan. 22, 2014, 4 pgs.

"Photomultiplier Handbook" Burle Industries, Inc., 1980, p. 92.

"CsI(TI), CsI(Na) Cesium Iodide Scintillation Material", Scintillation Products, Saint-Gobain Ceramics & Plastics, Inc., Copyright 2007-2012, 2 pages.

"BGO Bismuth Germanate Scintillation Material", Scintillation Products, Saint-Gobain Ceramics & Plastics, Inc., Copyright 2004-2012, 2 pages.

* cited by examiner

PHOTOSENSOR TESTING APPARATUS, A RADIATION DETECTION APPARATUS INCLUDING A PHOTOSENSOR AND A METHOD OF SELECTING THE PHOTOSENSOR FOR THE RADIATION DETECTION APPARATUS

CROSS-REFERENCE TO RELATED APPLICATIONS

This application claims priority under 35 U.S.C. §119(e) to U.S. Patent Application No. 61/707,995 entitled "Photosensor Testing Apparatus, a Radiation Detection Apparatus Including a Photosensor and a Method of Selecting the Photosensor for the Radiation Detection Apparatus" by Duraj et al. filed Sep. 30, 2012, and to U.S. Patent Application No. 61/718,507 entitled "Photosensor Testing Apparatus, a Radiation Detection Apparatus Including a Photosensor and a Method of Selecting the Photosensor for the Radiation Detection Apparatus" by Duraj et al. filed Oct. 25, 2012, all of which are assigned to the current assignee hereof and incorporated herein by reference in their entireties.

BACKGROUND

1. Field of the Disclosure

The following is directed to photosensor testing apparatuses and radiation detection apparatuses, and more particularly to using photosensor testing apparatuses to select photosensors for use in radiation detection apparatuses with photosensors and methods of selecting photosensors for radiation detection apparatuses, and the photosensor testing apparatuses and radiation detection apparatuses, themselves.

2. Description of the Related Art

Radiation detection apparatuses can include a scintillator and a photosensor. The photosensor should be matched to the scintillating light output by the scintillator. Problems can arise because a photosensor manufacturer may not have the scintillator to perform tests. Thus, the photosensor manufacturer may not know which photosensor works best for a particular scintillator. Photosensors are tested using a single light source, such as a white light source or a blue light source. Improvements in selecting photosensors for radiation detection apparatuses with scintillators are desired.

BRIEF DESCRIPTION OF THE DRAWINGS

Embodiments are illustrated by way of example and are not limited by the accompanying figures.

Figure 1:
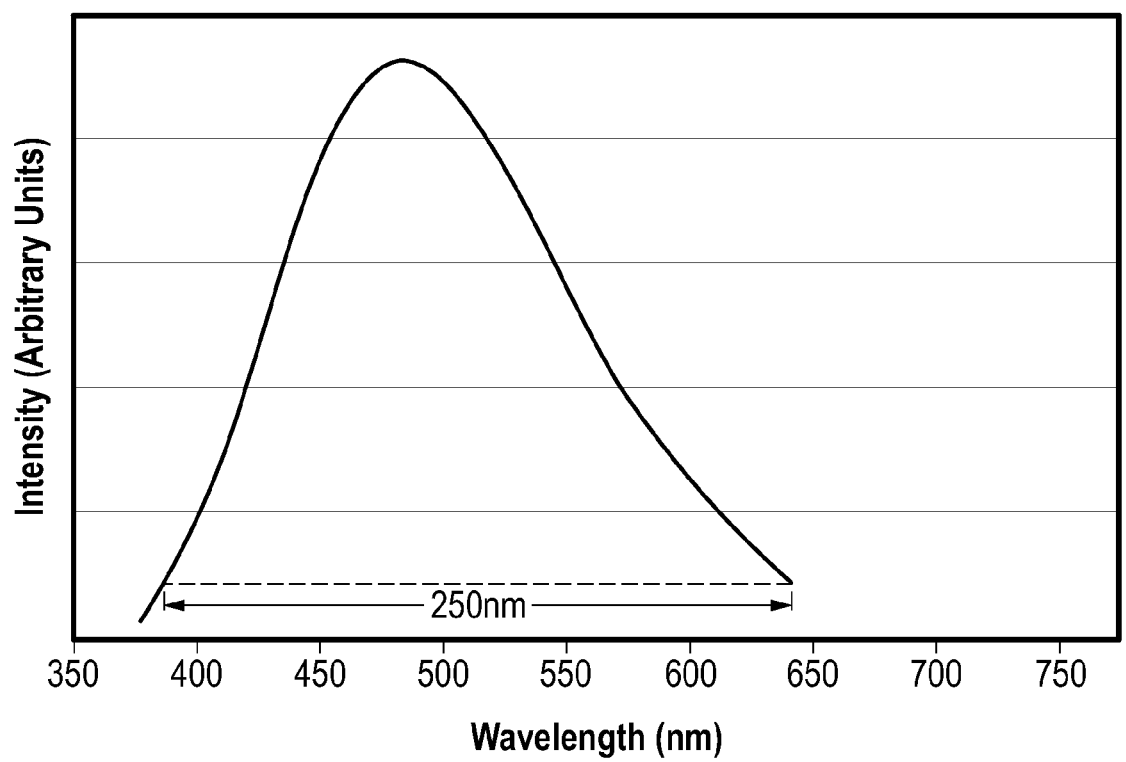
FIG. 1 includes a depiction of a plot of an intensity as a wavelength for scintillating light from a bismuth germinate scintillator.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "color type" is intended to mean the principal color associated with a photosensor or a light source. For example, a blue photosensor has its greatest sensitivity to light at a wavelength in the blue light spectrum, as opposed to other spectra, such as the green light spectrum or the red light spectrum. In another example, a green light source has its emission maximum at a wavelength in the green light spectrum, as opposed to the blue light spectrum or the red light spectrum.

The term "scintillator emission spectrum" is intended to mean a spectrum of intensity as a function of wavelength for scintillating light from a scintillator or a derivative of the scintillating light.

The terms "ultraviolet" and "UV" are each intended to mean radiation having a wavelength or spectrum of wavelengths in a range of 190 nm to 400 nm.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A photosensor testing apparatus can be used to test photosensors to determine which particular photosensor is better suited for a particular application as compared to any other photosensor tested. The photosensor testing apparatus can include the plurality of light sources that can be controlled to simulate light that corresponds to scintillating light for a particular scintillator or a derivative of the scintillating light. An example of the derivative of the scintillating light can include wavelength shifted light. In an embodiment, a combination of different light sources can be activated at the same time to simulate more closely the light that would be received by the photosensor if the photosensor would be used in a radiation detection apparatus having the particular scintillator. Further, a wavelength shifter can be used with any one or more of the light sources if needed or desired. The photosensor testing apparatus may operate in DC mode or pulse mode. Skilled artisans understand how to operate the photosensor in such modes, which are also addressed at http://sales.hamamatsu.com/assets/pdf/catsandguides/PMT_82-87.pdf. In an embodiment, the photosensor testing apparatus may include other components, such as a pre-amplifier or amplifier, a digital-to analog converter, a spectrum analyzer, a multichannel analyzer, a control module, or the like. Quantum efficiency, signal-to-noise ratio, another suitable parameter, or any combination thereof can be used as a criterion for selecting the photosensor. After selecting the photosensor, the photosensor can be part of a radiation detection apparatus that includes the particular scintillator corresponding to the simulated light. The radiation detection apparatus can include any of the components as described with respect to the photosensor testing apparatus, except that the plurality of different light sources is replaced by an assembly that includes a scintillator, and optionally, an optical coupling member.

The photosensor testing apparatus and method is particularly well suited for selecting a photosensor that will be used to receive scintillating light from a scintillator or a derivative of the scintillating light (for example, wavelength shifted light) that has (1) an emission maximum at a wavelength between wavelengths corresponding the highest quantum efficiencies for photosensors of different color types, (2) a scintillator emission spectrum that is relatively wide, or any combination thereof.

In an embodiment, scintillating light from a scintillator or a derivative of the scintillating light can have an emission spectrum where a width of the spectrum having an emission intensity that is at least 10% of the maximum emission intensity for the scintillating light or derivative thereof (hereinafter, the "10+% emission spectrum") is at least approximately 50 nm, at least approximately 70 nm, at least approximately 90 nm, at least approximately 110 nm, at least approximately 150 nm, at least approximately 200 nm, or at least approximately 250 nm. As the width of the 10+% emission spectrum increases, photosensors of different color types may be tested. The photosensors of different color types have their highest quantum efficiencies at different wavelengths. Such different wavelengths may be within approximately 150 nm, within approximately 100 nm, within approximately 90 nm, or within approximately 70 nm of each other. The scintillating light or a derivative thereof can have an emission maximum at a particular wavelength between the different wavelengths corresponding to the highest quantum efficiencies for photosensors of different color type. The particular wavelength corresponding to the emission maximum can be at least 25 nm away from each of the wavelengths corresponding to the highest quantum efficiencies. In another embodiment, the width of the 10+% emission spectrum is no greater than approximately 900 nm or no greater than approximately 500 nm.

In another embodiment, the photosensors may be of the same color type and wavelengths corresponding to the highest quantum efficiencies can be within approximately 50 nm or within approximately 20 nm of each other. The wavelength corresponding to the emission maximum of the scintillating light or a derivative thereof may or may not be between the wavelengths corresponding to the highest quantum efficiencies. The wavelength corresponding to the emission maximum may be at least 25 nm away from each of the wavelengths corresponding to the highest quantum efficiencies.

A scintillating light or a derivative thereof can have an emission maximum between different primary colors (blue, green, red or any of such primary colors and another radiation spectrum (for example, UV or infrared) and a relative large width of the 10+% emission spectrum. A bismuth germinate ("BGO") scintillator emits a teal (blue-green) light having an emission maximum between blue light and green light, and the scintillating light from the BGO scintillator has a relatively wide emission spectrum. FIG. 1 depicts an emission spectrum for the BGO scintillator. The BGO scintillator has an emission maximum of approximately 480 nm and the 10+% emission spectrum extends from approximately 390 nm to approximately 640 nm. Therefore, the width of the 10+% emission spectrum is approximately 250 nm (640 nm–390 nm).

Just by analyzing the emission spectrum in FIG. 1, the best photosensor for use may not be accurately determined. For the BGO scintillator, a blue photosensor or a green photosensor may be considered. The blue photosensor can be more responsive to the portion of the emission spectrum at wavelengths in a range of 400 nm to 500 nm, and the green photosensor can be more responsive to the portion of the emission spectrum at wavelengths in a range of 500 nm to 600 nm.

The scintillating light of BGO is more blue than green which would lean towards selection of a blue photosensor. However, the emission spectrum includes significant amounts of emission of green and yellow light, which would lean towards selection of a green photosensor. The emission spectrum by itself does not provide sufficient information as to whether a blue photosensor or a green photosensor should be selected. Further, the emission spectrum does not provide any information regarding noise generated by each of the blue and green photosensors, should the selection of the photosensor be at least partly based on signal:noise ratio of the photosensors. Still further, the emission spectrum does not provide sufficient information to select a particular blue photosensor from a group of blue photosensors or a particular green photosensor from a group of green photosensors.

Figure 2:
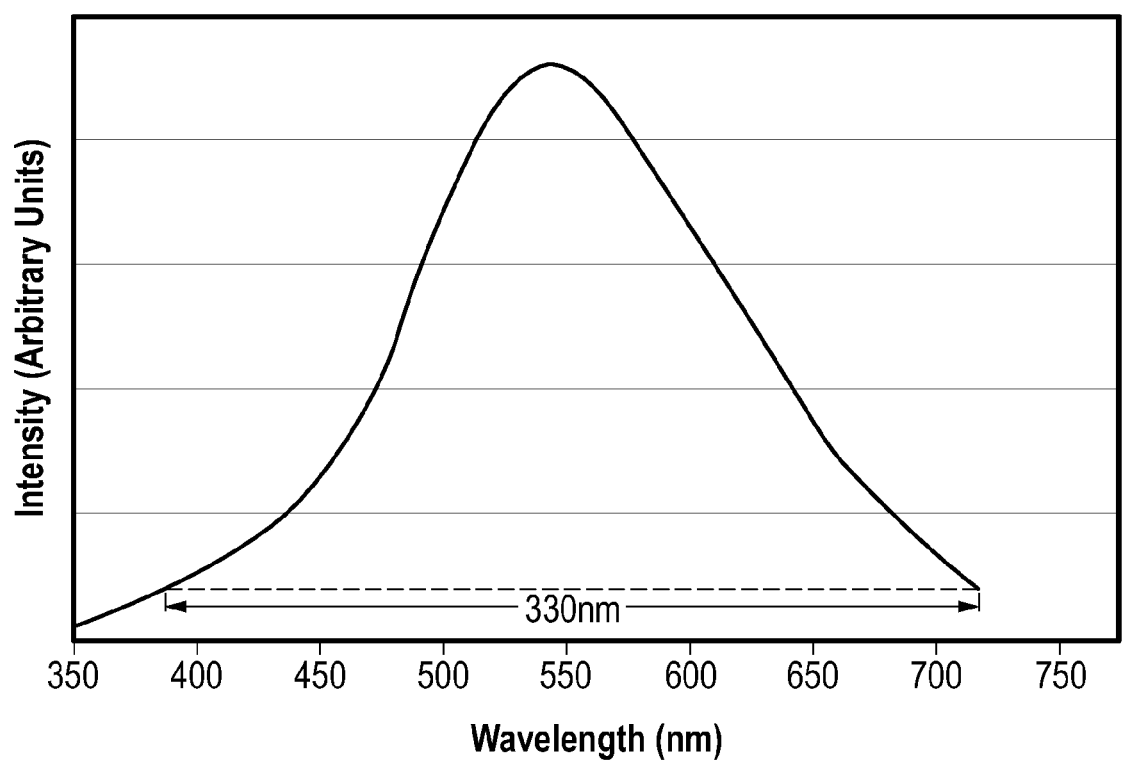
FIG. 2 includes a depiction of a plot of an intensity as a wavelength for scintillating light from a CsI(Tl) scintillator.

A CsI(Tl) scintillator emits green light and has a relatively wide emission spectrum. FIG. 2 depicts an emission spectrum for the CsI(Tl) scintillator. The CsI(Tl) scintillator has an emission maximum of approximately 540 nm and a width of the 10+% emission spectrum of approximately 330 nm. Similar to the BGO scintillator, just by analyzing the emission spectrum in FIG. 2, the best photosensor for use may not be accurately determined Three green photosensors may be considered for use with CsI(Tl). Of the three photosensors, a particular photosensor may have the highest sensitivity for radiation having wavelengths in a range of 500 nm to 600 nm but have poor sensitivity outside that range. The other photosensors can have a slightly less sensitivity for radiation having wavelengths in a range of 500 nm to 600 nm, where one of the other photosensors has a better sensitivity for radiation having wavelengths less than 500 nm as compared to the other two photosensors, and the remaining photosensor has a better sensitivity for radiation having wavelengths greater than 600 nm as compared to the other two photosensors. Thus, even though a green photosensor would be used, the selection of which green photosensor should be used is not readily apparent merely by analyzing the spectrum in FIG. 2.

The issues seen with BGO and CsI(Tl) may also occur with other scintillator compositions. Another scintillator that has an emission maximum near a mid-point between of photosensors of different color types or a relative wide scintillator emission spectrum can include $Lu_xY_{(1-x)}SiO_5(Ce)$, $CdWO_4$, an organic scintillator, or the like. Other scintillators can be simulated, and thus, the list above is merely illustrative and not intended to limit the scope of the present invention. Thus, the scintillator composition can be a metal halide (an alkali halide, a rare earth halide, including an elpasolite), a rare earth silicate, a rare earth garnet, a rare earth oxysulfide, a rare earth perovskite, or the like.

Further, issues are not only limited to different compositions of scintillators. Sensitivities of photocathodes of photosensors can significantly vary between photosensors of the same model number from the same manufacturer, and can even vary between photosensors from the same production run. Thus, the testing can be performed to select a particular photosensor that works best with a simulated spectrum corresponding to a scintillator that is to be used with the photosensor.

The photosensor testing apparatus can test photosensors of the same color type or different color types when using simulated light corresponding to a scintillator. Thus, the testing can take much of the guesswork out of determining which photosensor is the best selection for a particular scintillator composition. Characterization and matching of photosensors with crystals of the same composition is efficient and repeatable; reliance on the statistics of radiation is not needed.

Figure 3:
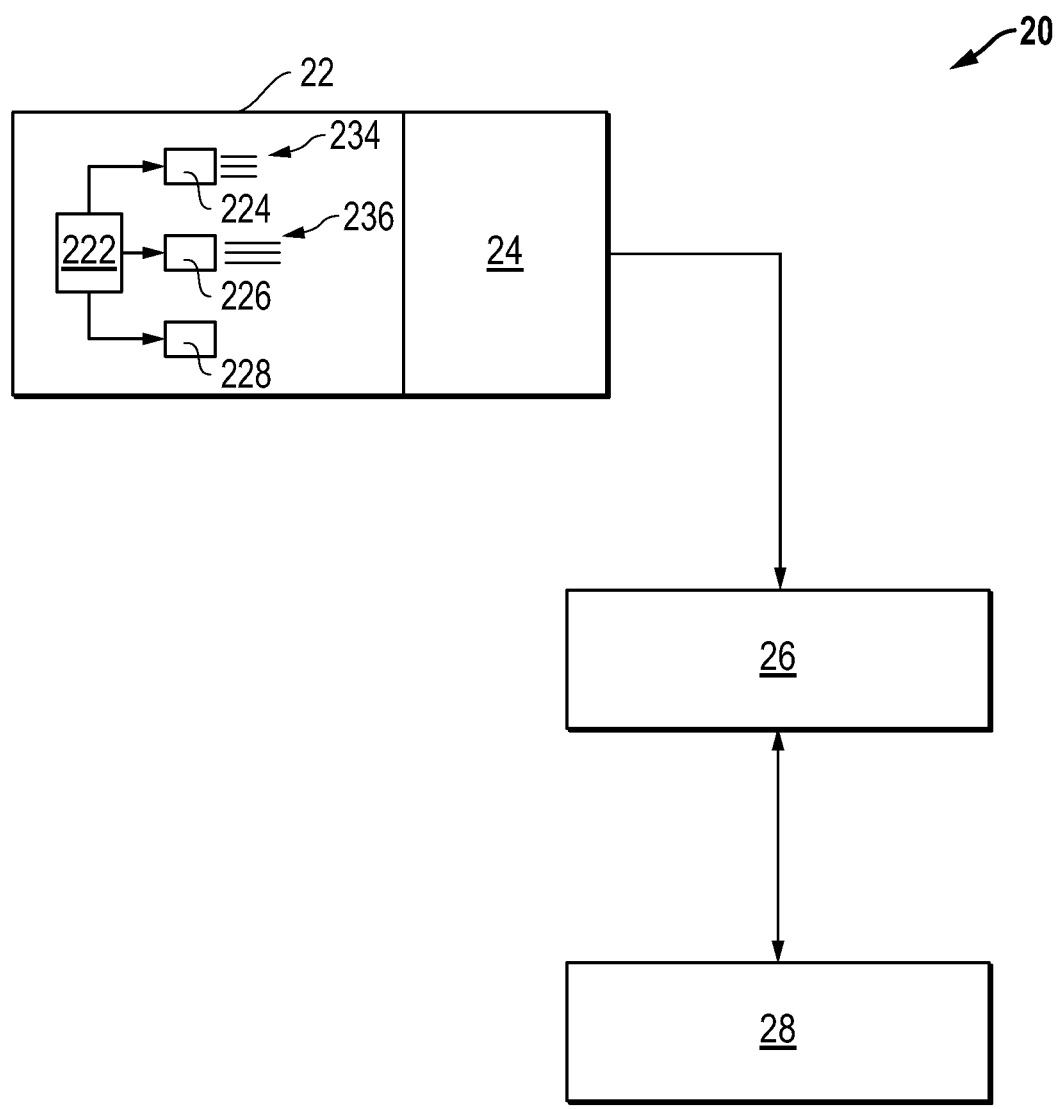
FIG. 3 includes a schematic depiction of a photosensor testing apparatus used to evaluate the performance a photosensor in accordance with an embodiment.

FIG. 3 includes a schematic depiction of a photosensor testing apparatus 20 during testing of a photosensor 24. In the embodiment illustrated, the photosensor testing apparatus 20 includes a light module 22, an analyzer module 26, and a control module 28. The photosensor testing apparatus 20 can be used to test the photosensor 24, and thus, the photosensor 24 may not be considered part of the photosensor testing apparatus 20. During testing, the photosensor 24 is optically coupled to the light module 22. The analyzer module 26 can be electronically coupled to the photosensor 24 and bidirectionally coupled to the control module 28. In another embodiment, the control module 28 can be coupled to other equipment in addition to or in place of the analyzer module 26.

The light module 22 includes a light controller 222 coupled to a plurality of light sources 224, 226, and 228. In another embodiment, a different number of light sources may be used. For example, only two different light sources may be present within the light module 22, and in another embodiment, four different light sources may be present within the light module 22. The light sources 224, 226, and 228 can include LEDs, such as any combination of a blue light emitting diode, a green light emitting diode, a yellow light emitting diode, a red light emitting diode, or a UV light emitting diode. Another light source may be used that can emit white light or radiation within the UV, visible, infrared, another radiation spectrum, or any combination thereof. The light controller 222 can control which light sources are on and off, and for light sources that are on, the emission intensity from each of the light sources 224, 226, and 228. The light sources 224, 226, and 228 are configured to allow light emitted from the light sources 224, 226, and 228 to be received by the photosensor.

In an embodiment, the light module 22 or an optical interface member (not illustrated) between the light module 22 and the photosensor 24, or both the light module 22 and the optical interface member may include a reflector, a diffusion, a collimator, a prism, a splitter, a wavelength shifter, another suitable optical device, or any combination thereof that may be used to improve intensity or coverage of the light, combine light from different light sources, wavelength shift, or condition the light before being received by the photosensor 24. In an embodiment, light from a single light emitter may be split, and some light may be directed to a wavelength shifter that can shift the wavelength of the emitted light to a longer wavelength. In this particular embodiment, the single light emitter can provide a plurality of light sources, as some emitting light will be split and wave shifted, and the other light may bypass the wavelength shifted, and both the wavelength shifted light and the other light may reach the photosensor 24. For example, part of blue light from a blue LED is wavelength shifted to green light, and other blue light may not be wavelength shifted. Both the green and the other blue light may be received by the photosensor 24 as teal light. If needed or desired, light from any one or more of the light sources 224, 226, and 228 may be rastered or otherwise scanned along a surface where the photosensor 24 can receive the light.

The photosensor testing apparatus 20 is to test a plurality of photosensors, and thus, the photosensor 24 is merely representative of one of the plurality of photosensors that can be tested using the photosensor testing apparatus 20. Thus, a particular photosensor is not a permanent component within the photosensor testing apparatus 20. The photosensor 24 can be a photodiode, a photomultiplier tube ("PMT"), a silicon photomultiplier tube, an avalanche photodiode, a hybrid PMT, or any combination thereof. The photosensor 24 may be classified by color type. For example, the photosensor 24 may be a blue photosensor, a green photosensor, a UV photosensor, or a photosensor of another suitable color type. Within the photosensor testing apparatus 20, the photosensor 24 can receive the light from the light module 22 and generate an electronic signal, such as an electronic pulse, in response to the light. Although not illustrated in FIG. 3, a preamplifier or an amplifier may be used to amplify the electronic signal from the photosensor 24 before it reaches the analyzer module 26. In another embodiment, the analyzer module 26 may include a preamplifier or amplifier.

The photosensor testing apparatus 20 can operate in a DC mode, and therefore, an analyzer module 26 may not be needed. When the photosensor testing apparatus 20 is operated in a pulse mode, the analyzer module 26 can be used and include an analog-to-digital converter to convert the electronic pulse or amplified electronic pulse into a digital form. The analyzer module 26 can include hardware, software, or firmware to analyze the digital signal. In an embodiment, the analyzer module 26 can be a multichannel analyzer, a storage oscilloscope, an ADC and a microcontroller, or the like.

The control module 28 may perform further analysis. For example, the control module 28 may be used to determine a quantum efficiency, a signal-to-noise ratio, another suitable performance parameter, or another combination thereof of the photosensor 24. Further, the control module can include control logic that can be used during the operation of the photosensor testing apparatus 20. The functions performed by the control module 28 may be in the form of hardware, software, firmware, or a combination thereof. In a particular embodiment the control logic can be in the form of circuits within an integrated circuit or on a printed circuit board, a combination of a central processing unit that can receive coded instructions, a field programmable gate array ("FPGA"), another suitable means for operating the photosensor testing apparatus 20, or any combination thereof. The control module 28 can also include a buffer to temporarily store data before the data are analyzed, written to storage, read, transmitted to another component or device, another suitable action is performed on the data, or any combination thereof. In a particular embodiment, the buffer can include a first-in-first-out ("FIFO") buffer memory.

After reading this specification, skilled artisans will appreciate that some of the functions as described being performed by a particular component within the photosensor testing apparatus 20 in the embodiment as illustrated in FIG. 3 may be performed by a different component. For example, all of the functions performed by the analyzer module 26 and control module 28 may be combined into a single module. Further, the control module 28 may be coupled to the light controller 222 to provide control signals to the light controller 222. In another embodiment, some or all of the functions of the light controller 222 may be performed by the control module 28 or another apparatus (not illustrated). Still further, the control module 28 may not be part of the photosensor testing apparatus 20. For example, the control module 28 may include a program or a software agent that includes code that can be read and executed by a computer to perform the functions as described herein.

Figure 4:
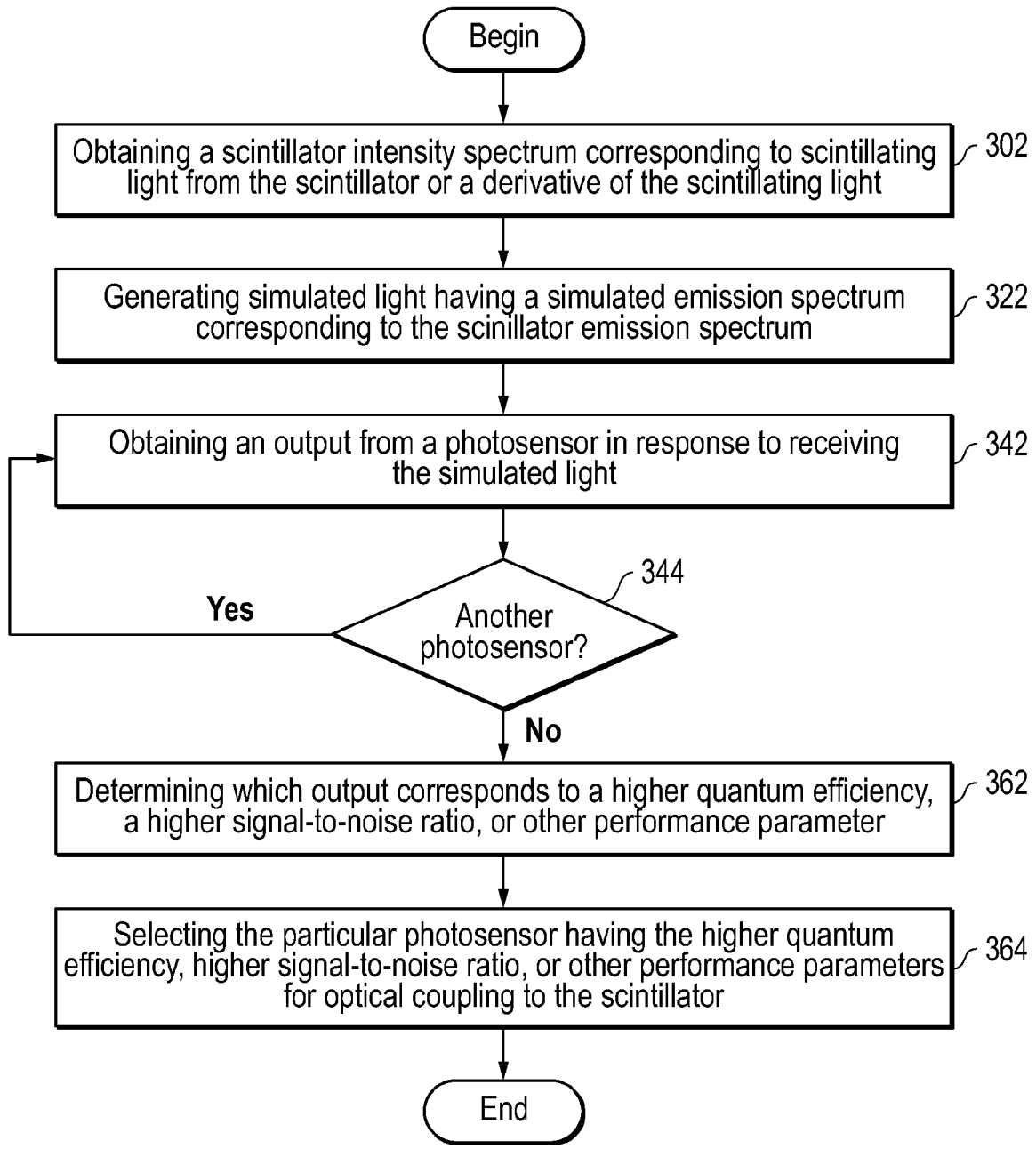
FIG. 4 includes a process flow chart for a method of testing photosensors in accordance with an embodiment.

FIG. 4 includes a flowchart of an exemplary method of using the photosensor testing apparatus 20. The method will be described with respect to components within the photosensor testing apparatus 20 as illustrated in FIG. 3. After reading this specification, skilled artisans will appreciate that activities described with respect to particular components may be performed by another component. Further, activities described with respect to particular components may be combined into a single component, and activities described with respect to a single component may be distributed between different components.

The method is to test a plurality of photosensors to determine which particular photosensor has a better performance characteristic as compared to any other photosensor tested for a particular scintillator that will be used in a radiation detection apparatus. Thus, the particular scintillator that will be used in the radiation detection apparatus can be determined before testing begins.

The method can include obtaining a scintillator emission spectrum corresponding to scintillating light from the scintillator or a derivative of the scintillating light, at block 302 in FIG. 4. Referring to FIG. 1, the scintillator emission spectrum that includes intensity as a function of wavelength for a BGO scintillator. The emission spectrum will be different for different scintillator materials.

The method can further include generating simulated light having a simulated emission spectrum corresponding to the scintillator emission spectrum, at block 322. The simulated light can be generated using a plurality of light sources, such as light sources 224, 226, and 228. The operation of the light sources 224, 226, and 228 are controlled by the light controller 222. During at least a portion of generating the simulated light, light is transmitted from at least two different color type light sources at the same time. Referring to FIG. 3, light 234 from the light source 224 and light 236 from light source 226 may be emitted at the same time. As represented by the lengths of the lines in FIG. 3, the intensity of light 234 is less than the intensity of light 236, as light 234 is represented by shorter lines than the lines representing light 236. No significant light is emitted by the light source 228. In another embodiment, the light sources 224 and 226 may produce light of substantially the same intensity or the light intensity from the light source 224 may be greater than the light intensity of light source 226.

Before proceeding, more details regarding the simulated spectrum is described to provide a better understanding of how to generate a simulated spectrum and how flexible the procedure is for a variety of emission spectra that are to be simulated. Each light source that may be used for simulating scintillating light or a derivative thereof can have its emission spectrum (intensity of light as a function of wavelength) measured using a spectrophotometer. The light source may be light from a LED, a laser, an incandescent lamp, another suitable light source, or wavelength shifted light. A library of spectra can be obtained for the light sources. In an embodiment, a white light source may be used. A white LED may have a blue light emitting component and a yellow light emitting component. In another embodiment, separate blue and yellow light sources may be desired to allow the blue light (emission maximum at approximately 460 nm) and yellow light (emission maximum at approximately 570 nm) to be controlled independently of one another.

Figure 5:
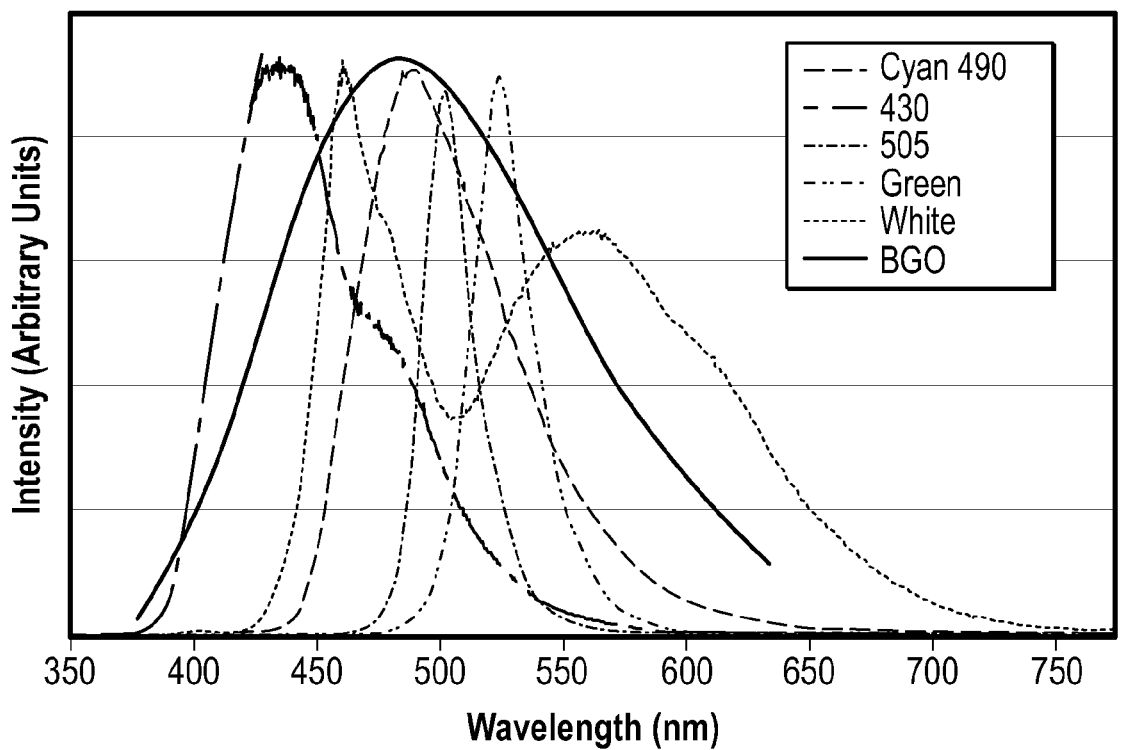
FIG. 5 includes a depiction of a plot of an intensity as a wavelength for light from the bismuth germinate scintillator and a plurality of different light sources.

An emission spectrum of a scintillator of interest may be obtained. Similar to the light sources, the emission spectrum can be scintillating light from the scintillator or a derivative of such scintillating light, for example, wavelength shifted scintillating light. Light sources from the library can be selected based on the emission spectrum of the scintillating light or a derivative thereof. Referring briefly to FIG. 5, light sources that can be used for BGO include Cyan 490, a 430 nm nominal light source, a 505 nm nominal light source, a green light source, and a white light source that has peaks at approximately 460 nm and approximately 570 nm. When comparing the BGO spectrum in FIG. 1 with the CsI(Tl) spectrum in FIG. 2, the CsI(Tl) spectrum has significantly more intensity at longer wavelengths. To simulate the CsI(Tl), all of the light sources for the BGO spectrum may be used except for the white light source. Further, a yellow light source and a red light source may be used to simulate the relatively higher intensities at longer wavelengths for CsI(Tl).

After the light sources from the library of light sources have been selected, the intensities of each of the light sources may be determined in order to match the emission spectrum of light that is to be received by the photosensor to be tested. The light sources may be voltage driven or current driven. Calculations may be performed to determine the intensities of each of the light sources. The actual measurements based on the calculations may be performed or empirical testing may be used to obtain a simulated spectrum. The simulated spectrum can be measured using a spectrophotometer and compared to the emission spectrum of the scintillating light or derivative thereof. If needed or desired, one or more intensities of the light sources may be adjusted to match more closely the emission spectrum of the emission spectrum of the scintillating light or a derivative thereof.

Figure 7:
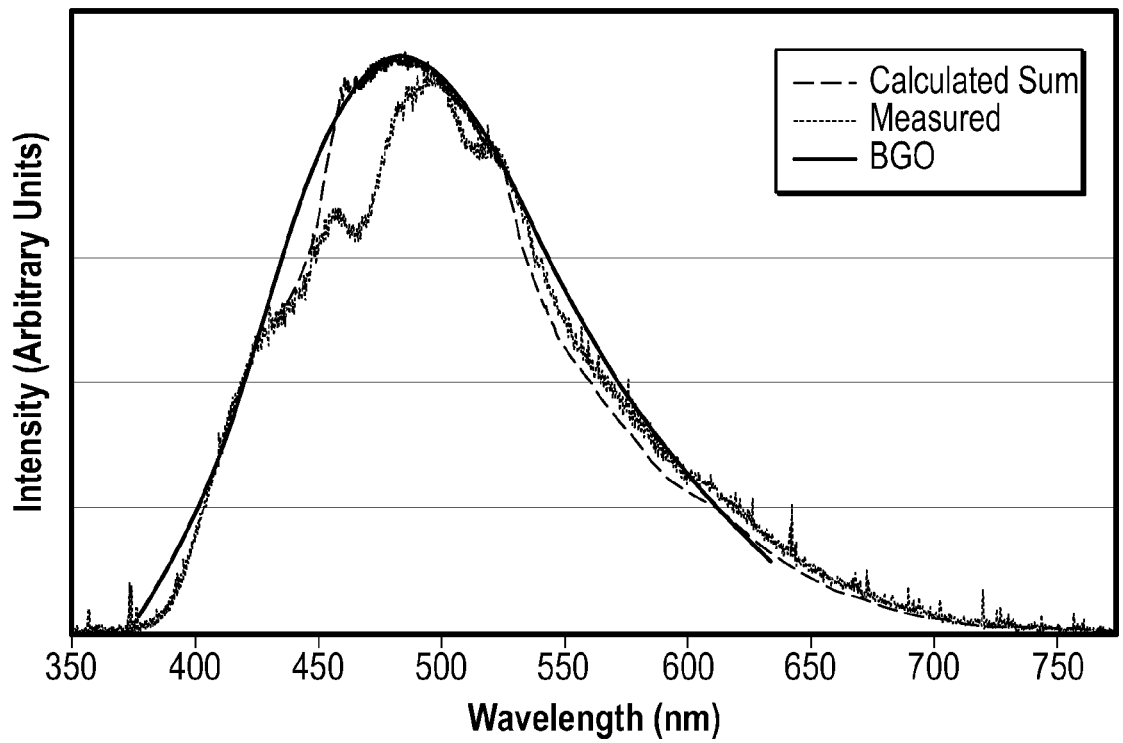
FIG. 7 includes a depiction of a plot of an intensity as a function for a BGO scintillator and simulated light (calculated and measured) when using a plurality of different light sources.

All five light sources, which emission spectra are illustrated in FIG. 5, are used to generate the calculated and measured emission spectra that is to simulate the BGO emission spectrum, as illustrated in FIG. 7. As can be seen in FIG. 7, the measured spectrum is a relatively low around 460 nm as compared to the BGO emission spectrum. The intensity of the white light source may be further increased. Alternatively, the white light source may be replaced by light sources having emission maxima at approximately 460 nm and 570 nm, so that the spectrum at 460 nm can be controlled independently from the spectrum at 570 nm. Thus, the intensity from the 460 nm light source can be increased relative to the intensity of the 570 nm.

After reading this specification, skilled artisans will be able to select light sources and determine intensities of such light sources in order to simulate scintillating light or a derivative thereof that would be received by a photosensor. Clearly, many different spectra of scintillating light or a derivative thereof can be simulated using the techniques as described herein.

Different photosensors can be tested using the simulated light. A photosensor to be tested is installed into the photosensor testing apparatus 20 where the photosensor 24 is located. The light source 22 is operated to produce the simulated light that corresponds to the scintillator light or a derivative thereof.

The method can include obtaining an output from the photosensor in response to receiving the simulated light, at block 342. The simulated light is received by the photosensor, and the photosensor generates an output in response to receiving the simulated light. The output can be in the form of an electronic pulse that is received and analyzed by the analyzer module 26, the control module 28, or both. The analysis may produce a quantum efficiency value, a signal-to-noise ratio, or another suitable parameter that quantifies the performance of the photosensor. A different photosensor can be tested using the photosensor testing apparatus 20 in a manner substantially identical to the prior photosensor. Testing can be continued until all photosensors are tested (see decision tree 344 in FIG. 4).

The method can further include determining which output corresponds to a higher quantum efficiency, a higher signal-to-noise ratio, or other performance parameter, at block 362. The method also includes selecting the particular photosensor having the higher quantum efficiency, higher signal-to-noise ratio, or other performance parameter for optical coupling to the scintillator in a radiation detection apparatus, at block 364. The user can determine which performance parameter or combination of performance parameters are to be used in selecting the photosensor. In an embodiment, the highest quantum efficiency may be desired, and in another embodiment, the highest signal-to-noise ratio may be desired. For example, a particular photosensor may have the highest quantum efficiency but also may generate a significant amount of noise, and another photosensor may not have as high of a quantum efficiency but produces substantially less noise. When the criterion is highest quantum efficiency, the former photosensor is selected, and when the criterion is the highest signal-to-noise ratio, the latter photosensor is selected.

Figure 6:
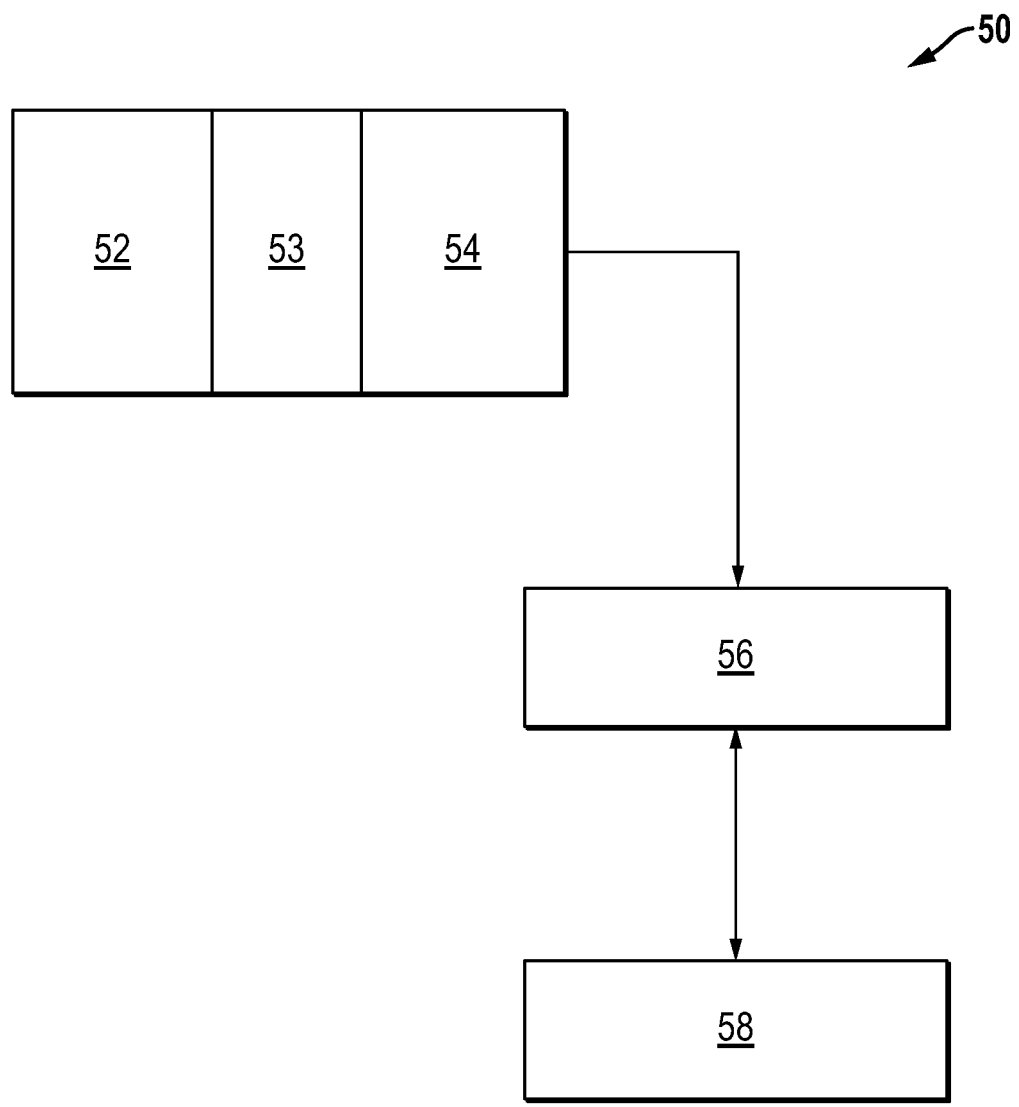
FIG. 6 includes a schematic depiction of a radiation detection apparatus including a selected photosensor in accordance with an embodiment.

FIG. 6 includes an illustration of an embodiment of a radiation detector system. The radiation detector system 50 can be a medical imaging apparatus, a well logging apparatus, a security inspection apparatus, or the like. In a particular embodiment, the radiation detection system can be used for gamma ray analysis, such as a Single Positron Emission Computer Tomography (SPECT) or Positron Emission Tomography (PET) analysis.

In the embodiment illustrated, the radiation detection system 50 includes a scintillator 52, an optical coupling member 53, a photosensor 54, an analyzer 56, and a control module 58. The scintillator 52 has an emission spectrum that corresponds to the simulated light used during photosensor testing. Thus, the scintillator 52 has any of the compositions as described herein. Although not illustrated, a reflector may be disposed around the scintillator 52. Another feature, such as a shock absorbing material, a spring, a neutron moderator (when the radiation detection apparatus is a neutron detection apparatus), another suitable feature, or any combination thereof may be present but is not illustrated in FIG. 6.

The optical coupling member 53 is optional, and when present, is optically coupled to the scintillator 52 and the photosensor 54. In an embodiment, the optical coupling member may include a quartz or sapphire window, a clear epoxy or silicon rubber, or any combination thereof. In another embodiment, the optical coupling member 53 can include a wavelength shifting material. The wavelength shifting material can shift the scintillating light from its original wavelength, which may or may not be outside the visible light spectrum, to a different wavelength. The wavelength shifting material may be wavelength shifting fibers or a wavelength shifting sheet. The wavelength shifting material can include a polyvinyltoluene, a polystyrene, a polyacrylate, or any combination thereof.

The photosensor 54 is the photosensor can be of any of the types as described herein. The photosensor 54 is selected using any of the methods previously described.

The analyzer 56 can be electronically coupled to the photosensor 54 and bidirectionally coupled to the control module 58. The electronic pulse generated by the photosensor 54 can be amplified using a pre-amplifier, and amplifier, or both. In an embodiment, the pre-amplifier, amplifier, or both may part of the analyzer module 56, in another embodiment, the pre-amplifier, amplifier, or both may be part of the photosensor 54, and in a further embodiment, the pre-amplifier may be part of the photosensor 54, and the amplifier may be part of the analyzer module 56. The analyzer module 56 can include an analog-to-digital converter to convert the electronic pulse or amplified electronic pulse into a digital signal. The analyzer module 56 can include hardware, software, or firmware to analyze the digital signal. In an embodiment, the analyzer module 56 can be a multichannel analyzer, a storage oscilloscope, an ADC and a microcontroller, or the like.

The control module 58 may perform further analysis. For example, the control module 58 may be pulse shape discrimination, count radiation, or perform another suitable function. Further, the control module can include control logic that can be used during the operation of the radiation detection apparatus 50. The functions performed by the control module 58 may be in the form of in hardware, software, firmware, or a combination thereof. In a particular embodiment the control logic can be in the form of circuits within an integrated circuit or on a printed circuit board, a combination of a central processing unit that can receive coded instructions, a field programmable gate array ("FPGA"), another suitable means for operating the radiation detection apparatus 50, or any combination thereof. The control module 58 can also include a buffer to temporarily store data before the data are analyzed, written to storage, read, transmitted to another component or device, another suitable action is performed on the data, or any combination thereof. In a particular embodiment, the buffer can include a first-in-first-out ("FIFO") buffer memory.

After reading this specification, skilled artisans will appreciate that some of the functions as described being performed by a particular component within the radiation detection apparatus 50 in the embodiment as illustrated in FIG. 6 may be performed by a different component. For example, all of the functions performed by the analyzer module 56 and control module 58 may be combined into a single module. Further, the control module 58 may not be part of the radiation detection apparatus 50. For example, the control module 58 may include a program or a software agent that includes code that can be read and executed by a computer to perform the functions as described herein.

Radiation can be captured by the scintillator 52 and emit scintillating light in response to the radiation. In an embodiment that includes wavelength shifting material within the optical coupling member 53, the scintillating light may become wavelength shifted light. The photosensor 54 can receive the light (scintillating light or a derivative of the scintillating light) and generate an electronic signal, such as an electronic pulse, in response to the light. Although not illustrated in FIG. 6, an amplifier may be used to amplify the electronic pulse generated in the photosensor 54. The analyzer 56 can include an analog-to-digital converter that converts the amplified electronic pulse, which is in the form of an analog signal, to a digital signal. The analyzer 56 can analyze the digital signal for intensity at different energy levels or perform another analysis. Information from the analysis can be sent from the analyzer 56 and received at the control module 58. The control module 58 can process the information received from the analyzer 56 and perform any function as previously described for the control module 28. The control module 58 may use the information received or generated or may transmit some or all of such information to equipment not illustrated in FIG. 6.

Embodiments as described herein can help to test photosensors to determine which particular photosensor is better suited for a particular application, as compared to other photosensors. The photosensor testing apparatus can be used to generate simulated light that corresponds to scintillating light or a derivative thereof that would be received by a photosensor if the photosensor would be optically coupled to a particular scintillator. The photosensor testing apparatus is particular well suited to simulate light that has an emission maximum at a wavelength between the wavelengths corresponding to the highest quantum efficiencies of photosensors of different color types and light that has a relatively wide emission intensity spectrum (for example, a relatively large width of the 10+% emission spectrum). Thus, a user can determine if a blue photosensor or a green photosensor is better for a radiation detection apparatus having a scintillator that can produce scintillating light or a derivative light that corresponds to the teal light. Further, the user can determine which particular photosensor from among photosensors of the same color type should be selected. After reading this specification, skilled artisans will appreciate that a photosensor testing apparatus and method allow for a selection of a photosensor that may not be possible only from analyzing an emission spectrum, data sheets or other information for the photosensors, or any combination thereof. Accordingly, the photosensor testing apparatus and method can take the guesswork out of selecting a photosensor without requiring the use of a scintillator or a radiation source needed to cause the scintillator to emit scintillating light.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A method including:
generating simulated light having a simulated emission spectrum corresponding to a scintillator emission spectrum that corresponds to scintillating light from a scintillator or a derivative of the scintillating light, wherein generating the simulated light is performed using a plurality of light sources, wherein during at least a portion of generating, generating includes, at a same time, transmitting light from at least two different color type light sources of the plurality of light sources;
obtaining a first output from a first photosensor in response to receiving the simulated light;
obtaining a second output from a second photosensor in response to receiving the simulated light;
determining which of the first and second outputs corresponds to a higher quantum efficiency or a higher signal-to-noise ratio; and
between the first and second photosensors, selecting the particular photosensor having the higher quantum efficiency or the higher signal-to-noise ratio for optical coupling to the scintillator.

Item 2. The method of Item 1, wherein the first photosensor has a highest quantum efficiency at a first wavelength; and the second photosensor has a highest quantum efficiency at a second wavelength.

Item 3. The method of Item 2, wherein the first and second wavelengths are within approximately 150 nm, within approximately 100 nm, within approximately 90 nm, within approximately 70 nm, within approximately 50 nm, or within approximately 20 nm of each other.

Item 4. The method of Item 2 or 3, wherein the scintillator has an emission maximum at a particular wavelength between the first and second wavelengths, wherein the particular wavelength is at least 25 nm away from each of the first and second wavelengths.

Item 5. The method of Item 2 or 3, wherein the scintillator has an emission maximum at a particular wavelength, and the particular wavelength is not between the first and second wavelengths.

Item 6. A method of making a radiation detection apparatus including performing the method of Item 1; and optically coupling the scintillator to the particular photosensor.

Item 7. A radiation detection apparatus including a scintillator and a first photosensor optically coupled to the scintillator, wherein the scintillator is capable of emitting scintillating light having a scintillator emission spectrum that has an emission maximum at a particular wavelength; the first photosensor has a highest quantum efficiency at a first wavelength; a second photosensor has a highest quantum efficiency at a second wavelength; the particular wavelength is between the first and second wavelengths and is at least 25 nm away from each of the first and second wavelengths; and the first photosensor has a higher quantum efficiency or a higher signal-to-noise ratio in response to receiving simulated light having a simulated emission spectrum corresponding to the scintillator emission spectrum or a derivative thereof as compared to the second photosensor; and the second photosensor is not optically coupled to the scintillator.

Item 8. A photosensor testing apparatus to test a plurality of photosensors, the photosensor apparatus including:
a light module including a plurality of light sources configured to emit light having emission maxima at different wavelengths;
a light controller configured to control the plurality of light sources to generate simulated light having a simulated emission spectrum corresponding to a scintillator emission spectrum that corresponds to scintillating light from a scintillator or a derivative of the scintillating light, wherein the light controller is configured such that light is capable of being emitted from at least two different color type light sources of the plurality of light sources;
an assembly configured to determine which particular photosensor of a first photosensor and a second photosensor within a plurality of photosensors has a higher quantum efficiency or a higher signal-to-noise ratio Item 9. The photosensor testing apparatus of Item 8, wherein the assembly is further configured to select the particular photosensor.

Item 10. The photosensor testing apparatus of Item 8 or 9, wherein the assembly includes a control module.

Item 11. The photosensor testing apparatus of Item 10, wherein the assembly further includes an analyzer.

Item 12. The method, radiation detection apparatus, or photosensor testing apparatus of any one of the preceding Items, wherein the first photo sensor has the higher quantum efficiency in response to receiving the simulated light as compared to the second photosensor.

Item 13. The method, radiation detection apparatus, or photosensor testing apparatus of any one of the preceding Items, wherein the first photosensor has the higher signal-to-noise ratio in response to receiving the simulated light as compared to the second photosensor.

Item 14. The method, radiation detection apparatus, or photosensor testing apparatus of any one of the preceding Items, wherein the simulated light is generated using a plurality of light emitting diodes.

Item 15. The method, radiation detection apparatus, or photosensor testing apparatus of any one of Items 14, wherein the plurality of light emitting diodes includes any combination of a blue light emitting diode, a green light emitting diode, a yellow light emitting diode, a red light emitting diode, and a UV light emitting diode.

Item 16. The method, radiation detection apparatus, or photosensor testing apparatus of Item 14 or 15, wherein the plurality of light emitting diodes includes at least two, at least three, or at least four different color types of light emitting diodes.

Item 17. The method The method, radiation detection apparatus, or photosensor testing apparatus of any one of the preceding Items, wherein the plurality of light sources include a white source, a UV light source, an infrared light source, or any combination thereof.

Item 18. The method, radiation detection apparatus, or photosensor testing apparatus of any one of the preceding Items, wherein:

the plurality of light sources includes a first light source and a second light source of a different color type as compared to the first light source;

at a first point in time, the first light source is operated at a first light intensity, and the second light source is operated at second light intensity, wherein the first and second light intensities are greater than zero; and at a second point in time, a light intensity of the first light source, the second light source, or both the first and second light sources is different than when at the first point in time.

Item 19. The method, radiation detection apparatus, or photosensor testing apparatus of Item 18, wherein, at the second point in time, the first light source is operated at a third light intensity that is different from the first light intensity; and the second light source is operated at substantially the second light intensity.

Item 20. The method, radiation detection apparatus, or photosensor testing apparatus of Item 18, wherein, at the second point in time, the first light source is operated at substantially the first light intensity; and the second light source is operated at a fourth light intensity that is different from the second light intensity.

Item 21. The method, radiation detection apparatus, or photosensor testing apparatus of Item 18, wherein, at the second point in time, the first light source is operated at a third light intensity that is different from the first light intensity; and the second light source is operated at a fourth light intensity that is different from the second light intensity.

Item 22. The method, radiation detection apparatus, or photosensor testing apparatus of Item 19 to 21, wherein, at the second point in time, each of the third and fourth light intensities is greater than zero.

Item 23. The method, radiation detection apparatus, or photosensor testing apparatus of Item 19 to 22, wherein, at the second point in time, either the third light intensity or the fourth light intensity is substantially zero.

Item 24. The method, radiation detection apparatus, or photosensor testing apparatus of any one of the preceding Items, wherein the scintillator emission spectrum has a width of an emission intensity that is at least 10% of the maximum emission intensity, wherein the width is at least approximately 50 nm, at least approximately 70 nm, at least approximately 90 nm, at least approximately 110 nm, at least approximately 150 nm, at least approximately 200 nm, or at least approximately 250 nm; or the width is no greater than approximately 900 nm or no greater than approximately 500 nm.

Item 25. The method, radiation detection apparatus, or photosensor testing apparatus of any one of the preceding Items, wherein the scintillator includes a metal halide, a rare earth silicate, a rare earth garnet, a rare earth oxysulfide, a rare earth perovskite, or an organic scintillator.

Item 26. The method, radiation detection apparatus, or photosensor testing apparatus of any one of the preceding Items, wherein the scintillator includes a bismuth germinate, a cesium iodide, a lutetium yttrium oxyorthoscilcate, a cadmium tungstate, or an organic scintillator.

Item 27. The method, radiation detection apparatus, or photosensor testing apparatus of any one of the preceding Items, further including a wavelength shifter adjacent to one or more light sources of the plurality of light sources Item 28. The method, radiation detection apparatus, or photosensor testing apparatus of any one of the preceding Items, wherein the first or second photosensor includes a photomultiplier tube.

Item 29. The method, radiation detection apparatus, or photosensor testing apparatus of any one of the preceding Items, wherein the first or second photosensor includes a semiconductor-based photomultiplier.

EXAMPLES

The concepts described herein will be further described in the following examples, which do not limit the scope of the invention described in the claims. The Examples demonstrate a plurality of light sources can be used to simulate scintillating layer that would be emitted from a BGO scintillator.

FIG. 5 includes emission intensities of individual light sources that can be used to simulate the scintillating light from the BGO scintillator. In this particular example, the LEDs have emission maxima at approximately 430 nm, approximately 490 nm, approximately 505 nm, and approximately 530 nm. A white light source has emission maxima at approximately 460 nm and approximately 570 nm is also used. The emission spectrum of BGO is provided in FIG. 5 for reference purposes.

Light intensities of each of the LEDs can be determined to provide a calculated emission spectrum. FIG. 7 includes the calculated emission spectrum. The light intensities of the light sources that correspond to the calculated emission spectrum are used and produce the measured emission spectrum. The emission spectrum of BGO is provided in FIG. 7 for reference. As can be seen in FIG. 7, both the calculated and measured emission spectra are close to the BGO emission spectrum. Further adjustment may be used to have the measured emission spectrum to be closer to the BGO emission spectrum.

Clearly, other scintillator emission spectra can be simulated using the plurality of LEDs or with other light sources.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
generating simulated light having a simulated emission spectrum corresponding to a scintillator emission spectrum that corresponds to scintillating light from a scintillator or a derivative of the scintillating light, wherein generating the simulated light is performed using a plurality of light sources, wherein during at least a portion of generating, generating comprises, at a same time, transmitting light from at least two different color type light sources of the plurality of light sources;
obtaining a first output from a first photosensor in response to receiving the simulated light, the first photosensor has a highest quantum efficiency at a first wavelength;
obtaining a second output from a second photosensor in response to receiving the simulated light, the second photosensor has a highest quantum efficiency at a second wavelength;
determining which of the first and second outputs corresponds to a higher quantum efficiency or a higher signal-to-noise ratio; and
between the first and second photosensors, selecting the particular photosensor having the higher quantum efficiency or the higher signal-to-noise ratio for optical coupling to the scintillator.

2. The method of claim 1, wherein the first and second wavelengths are within approximately 150 nm of each other.

3. The method of claim 1, wherein the scintillator has an emission maximum at a particular wavelength between the first and second wavelengths, wherein the particular wavelength is at least 25 nm away from each of the first and second wavelengths.

4. The method of claim 1, wherein the scintillator has an emission maximum at a particular wavelength, and the particular wavelength is not between the first and second wavelengths.

5. A method of making a radiation detection apparatus comprising:
performing the method of claim 1; and
optically coupling the scintillator to the particular photosensor.

6. The method of claim 1, wherein:
the first photosensor has the higher quantum efficiency in response to receiving the simulated light as compared to the second photosensor; or
the first photosensor has the higher signal-to-noise ratio in response to receiving the simulated light as compared to the second photosensor.

7. The method of claim 1, wherein the simulated light is generated using a plurality of light emitting diodes.

8. The method of claim 7, wherein the plurality of light emitting diodes includes any combination of a blue light emitting diode, a green light emitting diode, a yellow light emitting diode, a red light emitting diode, and a UV light emitting diode.

9. The method of claim 7, wherein the plurality of light emitting diodes includes at least two, at least three, or at least four different color types of light emitting diodes.

10. The method of claim 1, wherein the plurality of light sources include a white source, a UV light source, an infrared light source, or any combination thereof.

11. The method of claim 1, wherein:
the plurality of light sources includes a first light source and a second light source of a different color type as compared to the first light source;
at a first point in time, the first light source is operated at a first light intensity, and the second light source is operated at second light intensity, wherein the first and second light intensities are greater than zero; and
at a second point in time, a light intensity of the first light source, the second light source, or both the first and second light sources is different than when at the first point in time.

12. The method of claim 11, wherein, at the second point in time:
the first light source is operated at a third light intensity that is different from the first light intensity; and
the second light source is operated at substantially the second light intensity.

13. The method of claim 11, wherein, at the second point in time:
the first light source is operated at substantially the first light intensity; and
the second light source is operated at a fourth light intensity that is different from the second light intensity.

14. The method of claim 1, wherein the scintillator emission spectrum has a width of an emission intensity that is at least 10% of the maximum emission intensity, wherein the width is at least approximately 50 nm.

15. The method of claim 1, wherein the scintillator comprises a metal halide, a rare earth silicate, a rare earth garnet, a rare earth oxysulfide, a rare earth perovskite, or an organic scintillator.

16. The method of claim 1, further comprising a wavelength shifter adjacent to one or more light sources of the plurality of light sources.

17. A radiation detection apparatus comprising:
a scintillator that is capable of emitting scintillating light having a scintillator emission spectrum that has an emission maximum at a particular wavelength;
a first photosensor optically coupled to the scintillator, wherein:
the first photosensor has a highest quantum efficiency at a first wavelength;
a second photosensor has a highest quantum efficiency at a second wavelength;

the particular wavelength is between the first and second wavelengths and is at least 25 nm away from each of the first and second wavelengths; and the first photosensor has a higher quantum efficiency or a higher signal-to-noise ratio in response to receiving simulated light having a simulated emission spectrum corresponding to the scintillator emission spectrum or a derivative thereof as compared to the second photosensor; and the second photosensor is not optically coupled to the scintillator.

18. A photosensor testing apparatus to test a plurality of photosensors, the photosensor apparatus comprising:

a light module including a plurality of light sources configured to emit light having emission maxima at different wavelengths;

a light controller configured to control the plurality of light sources to generate simulated light having a simulated emission spectrum corresponding to a scintillator emission spectrum that corresponds to scintillating light from a scintillator or a derivative of the scintillating light, wherein the light controller is configured such that light is capable of being emitted from at least two different color type light sources of the plurality of light sources;

an assembly configured to determine which particular photosensor of a first photosensor and a second photosensor within a plurality of photosensors has a higher quantum efficiency or a higher signal-to-noise ratio.

19. The photosensor testing apparatus of claim 18, wherein the assembly is further configured to select the particular photosensor.

* * * * *